United States Patent

[11] 3,581,771

| [72] | Inventors | Robert A. Garrison<br>Newport Beach;<br>Charles F. Schoelm, Long Beach, both of, Calif. |
|---|---|---|
| [21] | Appl. No. | 868,508 |
| [22] | Filed | Oct. 22, 1969 |
| [45] | Patented | June 1, 1971 |
| [73] | Assignee | Garrison Manufacturing Co., Inc.<br>Santa Ana, Calif. |

[54] POWER STEERING VALVE
4 Claims, 5 Drawing Figs.

[52] U.S. Cl. ................................................. 137/625.69
[51] Int. Cl. ............................................... F16k 11/07
[50] Field of Search ........................................... 137/269, 270, 271, 596.12, 596.13, 625.69

[56] References Cited
UNITED STATES PATENTS
2,919,681  1/1960  Schultz ........................ 137/625.69
3,304,953  2/1967  Wickline ..................... 137/596.12

Primary Examiner—Henry T. Klinksiek
Attorney—Harris, Kiech, Russell & Kern

ABSTRACT: A power steering valve comprising a housing having therein a single valve spool movable between a neutral position and two operating positions respectively located on opposite sides of the neutral position. The housing is provided with an inlet port connectable to a pump, a return port connectable to a reservoir, and two operating ports connectable to opposite ends of a steering cylinder. The valve is an open center valve so that, in the neutral position of the spool, fluid flows through the valve from the inlet port to the return port. The spool is provided with blocking lands which substantially block the two operating ports in the neutral position of the spool. This prevents any pressure feedback to the operator of the vehicle when the steerable wheels of the vehicle encounter obstructions, or the like.

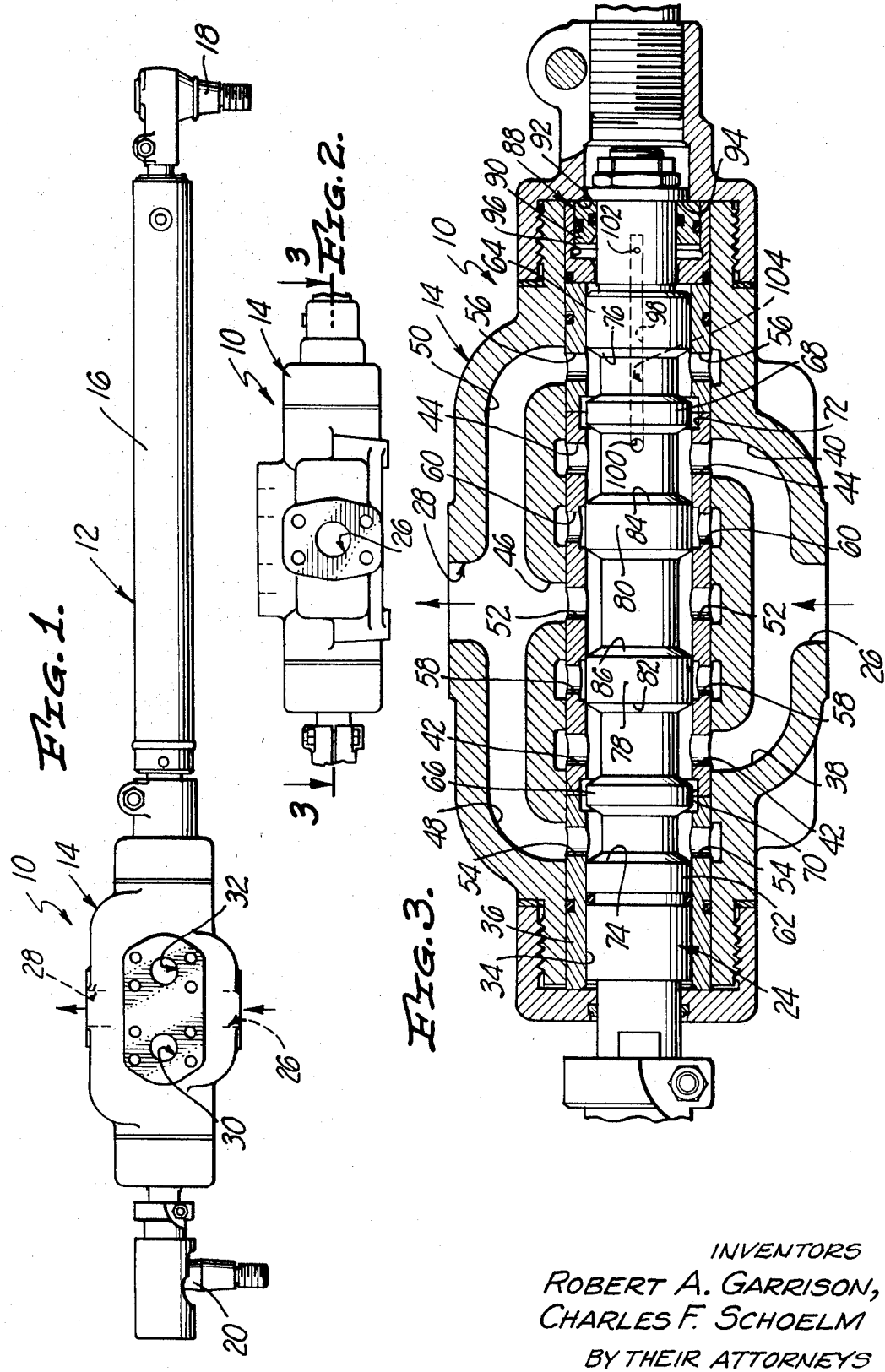

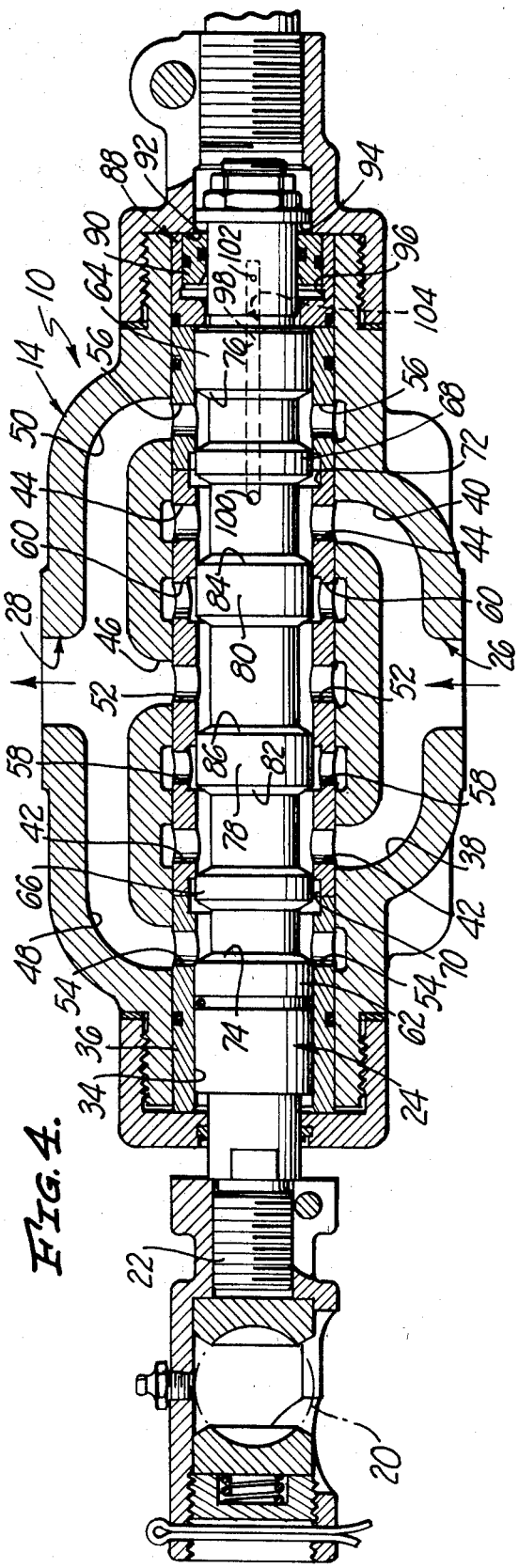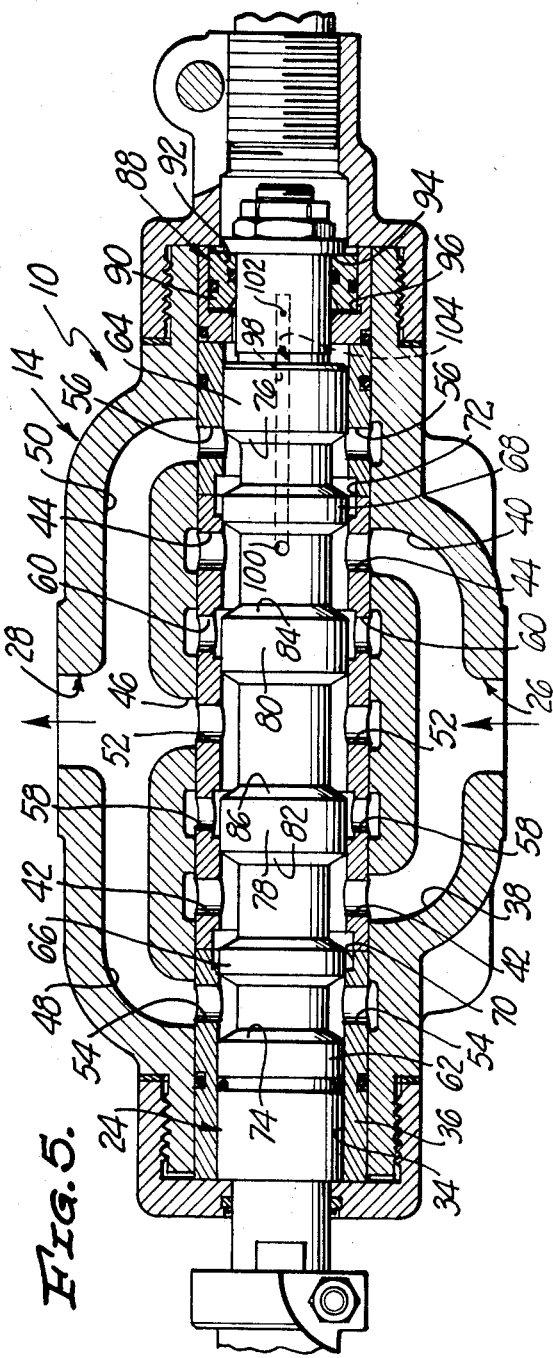
Fig. 4.
Fig. 5.
INVENTORS
ROBERT A. GARRISON,
CHARLES F. SCHOELM
BY THEIR ATTORNEYS
HARRIS, KIECH, RUSSELL & KERN

POWER STEERING VALVE

BACKGROUND OF INVENTION

The present invention relates in general to a control valve for directing fluid under pressure from an inlet port means to either of a pair of operating port means connected to a device to be controlled by the valve, and for directing return flow from the device from the other operating port means to a return port means. Typically, such a control valve is used as a power steering valve for regulating flow of fluid under pressure from a pump to a double acting steering cylinder and return flow from the steering cylinder back to a reservoir supplying the pump. Consequently, the invention will be considered herein as a power steering valve for convenience, with the understanding that this valve may be used for other purposes. Examples of power steering valves of the type to which the invention relates may be found in U.S. Pat. Nos. Re. 23,867, reissued Sept. 14, 1954, and 2,824,447, issued Feb. 25, 1958, both to Robert A. Garrison, one of the present applicants.

As background, the power steering valve of the invention includes a housing provided therein with the aforementioned inlet port means, return port means and operating port means, the inlet port means being connectable to a pump, or other source of operating fluid under pressure, the two operating port means being connectable to opposite ends of a double acting steering cylinder, or the like, and the return port means being connectable to a reservoir supplying the intake side of the pump. A valve spool is movable in a cylindrical spool chamber in the housing between a neutral position and two operating positions respectively located on opposite sides of the neutral position.

Preferably, the valve is an open center valve which connects the return port means to the inlet port means in the neutral position of the spool so that the operating fluid under pressure may flow freely through the valve from the pump back to the reservoir under such conditions. To achieve this, the valve is provided with what is referred to hereinafter as an open center control means, including annular grooves in the spool, for connecting the return port means to the inlet port means in the neutral position of the spool.

The valve also includes what is hereinafter referred to as an operating control means, also including annular grooves in the spool, for connecting one of the operating port means to the inlet port means and the return port means to the other operating port means in one of the operating positions of the spool, and for connecting the second operating port means to the inlet port means and the return port means to the first operating port means in the other operating position of the spool.

The foregoing construction is typical of a control valve of this general type, whether used as a power steering valve, or for other, functionally analogous purposes.

SUMMARY AND OBJECTS OF INVENTION

With the foregoing background in mind, a primary object of the invention is to provide a single-spool valve having means for substantially blocking the two operating port means in the neutral position of the spool. With this construction, any back pressure surges in the lines between the operating port means and the steering cylinder are substantially blocked out of the valve, irrespective of the source of such surges. For example, considering the invention as applied to heavy construction equipment required to operate over very irregular terrain, a rock, or other obstruction, encountered by one of the steerable wheels of the vehicle during straight line travel produces a back pressure surge in the line to one of the operating port means. The blocking means substantially blocks this surge out of the valve so that the hydraulic effect of the obstruction is not transmitted to the operator of the vehicle, which is an important feature of the invention.

Another object is to provide a valve wherein the blocking means comprises annular lands on the spool respectively registering with and substantially blocking the operating port means when the spool is in its neutral position.

Still another object is to provide a valve having in a single valve spool annular grooves and lands capable of providing an open center effect and of substantially blocking the operating port means in the neutral position of the spool, and capable of directing fluid under pressure and return fluid to and from the proper operating port means in the respective operating positions of the spool.

Still another object is to provide a power steering valve of the foregoing nature having hydraulic reaction means for providing the operator of the vehicle with a "feel" proportioned to the steering resistance encountered by the steerable wheels.

The foregoing objects, advantages, features and results of the present invention, together with various other objects, advantages, features and results thereof which will be evident to those skilled in the power steering art in the light of this disclosure, may be achieved with the exemplary embodiment of the invention illustrated in the accompanying drawings and described in detail hereinafter.

DESCRIPTION OF DRAWINGS

In the drawings:

FIG. 1 is an elevational view of a steering link incorporating a power steering valve which embodies the invention;

FIG. 2 is a fragmentary elevational view showing the power steering valve as viewed from below in FIG. 1;

FIG. 3 is an enlarged sectional view taken as indicated by the arrowed line 3-3 of FIG. 2, and showing a valve spool of the invention in a neutral position; and FIGS. 4 and 5 are views similar to FIG. 3, but showing the valve spool in its respective operating positions on opposite sides of the neutral position.

DESCRIPTION OF EXEMPLARY EMBODIMENT OF INVENTION

Referring initially to FIG. 1 of the drawings, the power steering valve of the invention is designated generally therein by the numeral 10 and is shown as forming part of a steering valve link 12 generally similar, for example, to the steering valve link 18 of the aforementioned reissue patent. The power steering valve 10 includes a housing 14, one end of which is connected to a link member 16 forming part of the steering valve link 12. A ball joint 18 is connected to the end of the link member 16 remote from the steering valve housing 14. At the other end of the steering valve link 12 is another ball joint 20 connected, as shown in FIG. 4, to an axially projecting end 22 of a valve spool 24 in the housing 14. The ball joints 18 and 20 may be connected to various structures, as disclosed, for example, in the aforementioned patents, or as disclosed in the copending application of Robert A. Garrison, Ser. No. 852,417, filed Oct. 22, 1969.

Considering the power steering valve 10 in more detail, the housing 14 is provided with an inlet port means 26 connectable to a pump, not shown, or other source of operating fluid under pressure, a return port means 28 connectable to a reservoir, not shown, associated with the pump and connected to the intake thereof, and two operating port means 30 and 32 respectively connectable to opposite ends of a double acting steering cylinder, not shown. The various port means 26, 28, 30 and 32 communicate at locations to be described with the interior of a cylindrical spool chamber 34 within the housing 14 and in which the valve spool 24 is axially movable. In the particular construction illustrated, the spool chamber 34 is defined by a sleeve 36 forming part of the housing 14. The valve spool 24 is reciprocable in the spool chamber 34 between a neutral position, FIG. 3, and two operating positions, FIGS. 4 and 5, respectively located on opposite sides of the neutral position.

The inlet port means 26 is bifurcated and includes two branches 38 and 40 terminating in axially spaced inlet ports 42 and 44 communicating with the spool chamber 34.

The return port means 28 is also bifurcated and includes a central branch 46 and two axially outer branches 48 and 50. The central branch 46 terminates in central radial ports 52 in communication with the spool chamber 34 between the inlet ports 42 and 44. The branches 48 and 50 terminate in axially outer return ports 54 and 56 in communication with the spool chamber 34 axially outwardly of the inlet ports 42 and 44, respectively.

The operating port means 30 and 32 respectively include radial operating ports 58 and 60 in communication with the spool chamber 34 between the central return ports 52 and the inlet ports 42 and 44, respectively.

The valve spool 24 is provided at its ends with lands 62 and 64 which respectively close the ends of the spool chamber 34 axially outwardly of the outer return ports 54 and 56. Axially inwardly from the respective end lands 62 and 64 are annular lands 66 and 68 which, in the neutral position of the valve spool 24, FIG. 3, register with internal annular grooves 70 and 72, respectively, in the circumferential wall of the spool chamber 34. The lands 66 and 68 are appreciably narrower than the corresponding grooves 70 and 72 for a reason which will become apparent. The lands 66 and 68 are separated from the end lands 62 and 64, respectively, by external annular grooves 74 and 76, respectively, in the valve spool 24.

Axially inwardly from the lands 66 and 68 are annular lands 78 and 80, respectively. The lands 78 and 80 are separated from the lands 66 and 68 by external annular grooves 82 and 84, respectively. The lands 78 and 80 are themselves separated by an external annular groove 86.

Considering the operation of the steering valve 10 as thus far described, the neutral position of FIG. 3 will be taken up first. Under the conditions of FIG. 3, the lands 78 and 80 respectively substantially block the respective operating ports 58 and 60, being slightly wider than internal annular channels in the circumferential wall of the spool chamber 34 with which the ports 58 and 60 communicate. Under such conditions, the blocking lands 78 and 80 substantially block out of the steering valve 10 any pressure surges in the operating lines leading to the steering cylinder. Such pressure surges may, for example, be due to the encountering of rocks, or other obstructions, by the steerable wheels of the vehicle. As will be apparent, if one steerable wheel hits a rock during straight line travel with the steering valve 10 in its neutral position, a higher fluid pressure will be created in one end of the steering cylinder than in the other. The corresponding blocking land 78 or 80 substantially blocks this higher pressure out of the steering valve 10 to preclude its transmission to the operator of the vehicle, which is an important feature. Preferably, the edges of the blocking lands 78 and 80 are beveled slightly, not shown, to permit the passage of fluid at a rate sufficient to prevent cavitation in the low pressure operating port means 30 or 32 in response to a pressure surge in the other.

As will be apparent from FIG. 3, the steering valve 10 is an open center valve. More particularly, when the valve spool 24 is in its neutral position, FIG. 3, fluid may flow therethrough from the inlet port means 26 into the return port means 28. Specifically, fluid flows from the inlet ports 42 and 44 through the respective annular grooves 82 and 84, the respective annular grooves 70 and 72, and the respective annular grooves 74 and 76, into the respective outer return ports 54 and 56, this being the reason for making the lands 66 and 68 narrower than the respective grooves 70 and 72. The foregoing elements constitute the open center control means mentioned earlier herein.

When the valve spool 24 is shifted into one or the other of its operating positions, respectively shown in FIGS. 4 and 5, the lands 66 and 68 prevent direct communication between the inlet port means 26 and the return port means 28. In the FIG. 4 position, the blocking land 78 permits the flow of operating fluid under pressure from the inlet ports 42 to the operating ports 58 by way of the annular groove 82. At the same time, the blocking land 80 permits return flow from the operating ports 60 to the central return ports 52 through the annular groove 86. Such elements constitute the operating control means mentioned.

When the valve spool 24 is in the operating position of FIG. 5, the operation is similar to that of FIG. 4, but reversed. Consequently, a detailed description is not necessary.

The steering valve 10 includes a hydraulic reaction means 88 similar to those disclosed in the aforementioned patents for hydraulically biasing the housing 14 and the valve spool 24 toward their relative neutral positions of FIG. 3 irrespective of whether the valve spool has been shifted relative to the housing into the operating position of FIG. 4, or that of FIG. 5. The hydraulic reaction means 88 includes a port reaction ring 90 carried by the valve spool 24 and either engageable with an annular seat 92 on the housing 14, FIG. 4, or an annular seat 94 on the valve spool. The operating fluid pressure in the inlet means 26 is communicated to an annular chamber 96 between the reaction ring 90 and the land 64 through a passage means 104 comprising an axial passage 98 and radial ports 100 and 102 in the valve spool 24. When the valve spool 24 is in the FIG. 4 position, the pressure in the annular space 96 acts on the reaction ring 90 to bias the housing 14 toward the right relative to the valve spool to tend to restore the housing and the valve spool to their relative neutral positions. The reverse occurs in the FIG. 5 position wherein the reaction ring 90 is seated against the annular seat 94 on the valve spool, instead of against the annular seat 92 on the housing.

The port 102 is of reduced diameter so that it acts as a throttling means which throttles flow into and out of the annular space 96 through the passage means 104 as the valve spool 24 is displaced axially. Thus, the restricted port or throttling means 102 acts as a hydraulic damper to prevent chatter of the valve spool 24, which is an important feature.

Although an exemplary embodiment of the invention has been disclosed herein for purposes of illustration, it will be understood that various changes, modifications and substitutions may be incorporated in such embodiment.

We claim as our invention:
1. In a power steering valve, or the like, the combination of:
   a. a housing having an inlet port means, a return port means and two operating port means;
   b. a single valve spool in said housing movable between a neutral position and two operating positions respectively located on opposite sides of said neutral position;
   c. open center control means, including annular grooves in said spool, for connecting said return port means to said inlet port means in said neutral position of said spool;
   d. operating control means, including annular grooves in said spool, for connecting one of said operating port means to said inlet port means and said return port means to the other of said operating port means in one of said operating positions of said spool, and for connecting said other operating port means to said inlet port means and said return port means to said one operating port means in the other of said operating positions of said spool; and
   e. blocking means, comprising annular lands on said spool, for substantially blocking said operating port means in said neutral position of said spool.

2. A power steering valve as set forth in claim 1 wherein:
   a. said housing provides a cylindrical spool chamber in which said spool is axially movable;
   b. said inlet port means includes two axially spaced inlet ports communicating with said chamber;
   c. said return port means includes a central return port in communication with said chamber between said inlet ports and two outer return ports in communication with said chamber axially outwardly of said inlet ports, respectively; and
   d. said operating port means including operating ports in communication with said chamber between said central return port and said inlet ports, respectively.

3. A power steering valve according to claim 2 wherein said blocking means includes two axially spaced annular blocking lands respectively registering with and substantially blocking said operating ports when said spool is in said neutral position, said blocking lands respectively separating said operating ports from said central return port in said operating positions of said spool.

4. A power steering valve as defined in claim 1 including hydraulic reaction means for hydraulically biasing said housing and said valve spool toward their relative neutral positions, and including restricted throttling means for throttling fluid flow to and from said hydraulic reaction means.